United States Patent
Hong et al.

(10) Patent No.: US 10,550,574 B2
(45) Date of Patent: Feb. 4, 2020

(54) ROOFING PRODUCT INCLUDING BIO-BASED ASPHALT MIXTURE AND METHODS OF MAKING THE ROOFING PRODUCT AND THE ROOFING-GRADE ASPHALT MIXTURE

(71) Applicants: Keith C. Hong, Lititz, PA (US);
Gregory F. Jacobs, Oreland, PA (US);
Rajesh Ranjan, Princeton, NJ (US)

(72) Inventors: Keith C. Hong, Lititz, PA (US);
Gregory F. Jacobs, Oreland, PA (US);
Rajesh Ranjan, Princeton, NJ (US)

(73) Assignee: CERTAINTEED CORPORATION, Malvern, PA (US)

( * ) Notice: Subject to any disclaimer, the term of this patent is extended or adjusted under 35 U.S.C. 154(b) by 565 days.

(21) Appl. No.: 13/841,491

(22) Filed: Mar. 15, 2013

(65) Prior Publication Data

US 2013/0295394 A1     Nov. 7, 2013

Related U.S. Application Data

(60) Provisional application No. 61/641,285, filed on May 1, 2012.

(51) Int. Cl.
*C09D 195/00* (2006.01)
*E04D 1/20* (2006.01)

(52) U.S. Cl.
CPC .............. *E04D 1/20* (2013.01); *C09D 195/00* (2013.01); *Y10T 428/31641* (2015.04); *Y10T 428/31815* (2015.04); *Y10T 428/31819* (2015.04)

(58) Field of Classification Search
None
See application file for complete search history.

(56) References Cited

U.S. PATENT DOCUMENTS 4,332,704 A * 6/1982 Marzocchi .............. C08L 95/00
523/203
4,835,199 A * 5/1989 Futamura ................ C08L 95/00
524/66

(Continued)

FOREIGN PATENT DOCUMENTS

CS      277479 B6 * 3/1993
DE   19519539 A1 * 12/1995 .............. C08L 95/00

(Continued)

OTHER PUBLICATIONS

English machine translation of FR 2951730 (2011).*

(Continued)

*Primary Examiner* — Kenneth J Stachel
(74) *Attorney, Agent, or Firm* — Abel Schillinger, LLP; Thomas H Osborn

(57) ABSTRACT

A method of forming an asphalt mixture includes mixing a polyol with a bio-source material to form a bio-asphalt. The method can further include mixing the bio-asphalt with a bitumen source different from the bio-asphalt to form an asphalt mixture. The bio-source material can include an oil, such as a vegetable oil, an animal fat, or any combination thereof. The bitumen source can include a petroleum-based asphalt. The method can further include adding a modifier, such as a fatty acid, a polycarboxylic acid, a polyacrylic acid, a polyacrylate comprising a copolymer, or any combination thereof. Moreover, a roofing grade asphalt mixture includes a bio-asphalt. The bio-asphalt includes an alkyd, wherein the alkyd is a reaction product of a polyol and a bio-source material. The roofing grade asphalt mixture further includes a bitumen source material and particles.

11 Claims, 2 Drawing Sheets

(56) References Cited

U.S. PATENT DOCUMENTS

| | | | | |
|---|---|---|---|---|
| 4,895,754 | A | * | 1/1990 | Graham .................. C08K 9/04 106/281.1 |
| 5,494,728 | A | * | 2/1996 | Vermilion ................. B32B 5/26 156/181 |
| 7,119,135 | B2 | | 10/2006 | Neimann |
| 7,241,500 | B2 | | 7/2007 | Shiao et al. |
| 7,998,265 | B2 | | 8/2011 | Buras et al. |
| 2005/0072110 | A1 | | 4/2005 | Shiao et al. |
| 2005/0131092 | A1 | * | 6/2005 | Kurth ..................... C08G 18/10 521/110 |
| 2008/0220167 | A1 | | 9/2008 | Wisniewski et al. |
| 2008/0275192 | A1 | | 11/2008 | Melnyk et al. |
| 2010/0126663 | A1 | * | 5/2010 | Kalkanoglu ............ C08L 95/00 156/289 |
| 2010/0204376 | A1 | | 8/2010 | Lenges et al. |
| 2011/0259239 | A1 | * | 10/2011 | Wen ..................... C04B 26/003 106/246 |

FOREIGN PATENT DOCUMENTS

| | | | | |
|---|---|---|---|---|
| EP | 0568757 | A1 | * 11/1993 | ............. C08L 95/00 |
| EP | 1524300 | A1 | 10/2004 | |
| FR | 2951730 | A1 | * 4/2011 | |
| GB | 1076648 | A | * 7/1967 | ............... C08L 9/00 |

OTHER PUBLICATIONS

English machine translation of DE19519539 (1995).*
Blown (Air-Oxidized) Vegetable and Marine Oils and Paint Manufacture ES Lower Pigment & Resin Technology vol. 16 Issue 5 abst (1987).*
English machine translation CS277479 (1993).*
English machine translation of EP0568757 (1993).*

* cited by examiner

ROOFING PRODUCT INCLUDING BIO-BASED ASPHALT MIXTURE AND METHODS OF MAKING THE ROOFING PRODUCT AND THE ROOFING-GRADE ASPHALT MIXTURE

This applications claims priority to and benefit of U.S. App. Ser. No. 61/641,285, filed on May 1, 2012, and is incorporated herein by reference in its entirety.

FIELD OF THE DISCLOSURE

The present disclosure relates to asphalt mixtures, roofing products and methods of making the roofing products and asphalt mixtures.

RELATED ART

Asphalt mixtures can find applications in the paving or roofing industries. Roofing products can be in different forms, such as shingles or membranes. The roofing products can include a base material and a bituminous material. The base material can include wood, a wood derivative (e.g., paper), fiberglass, organic fibers (e.g., polyester), or the like. Conventionally, the bituminous material can include asphalt, a filler, and potentially a plasticizer or a rubber modifier. A variety of fillers has been used including limestone, talc, fly ash, coal fines, or other relatively inert materials. Limestone has been most commonly used as filler in roofing products due to its relatively low cost and its compatibility with a wide variety of materials used for roofing products. Regardless of the composition of a roofing product, the roofing product must still be able to withstand the rigors of shipping and handling, installation, and exposure to outdoor environments for many years.

BRIEF DESCRIPTION OF THE DRAWINGS

Embodiments are illustrated by way of example and are not limited in the accompanying figures.

Figure 1:
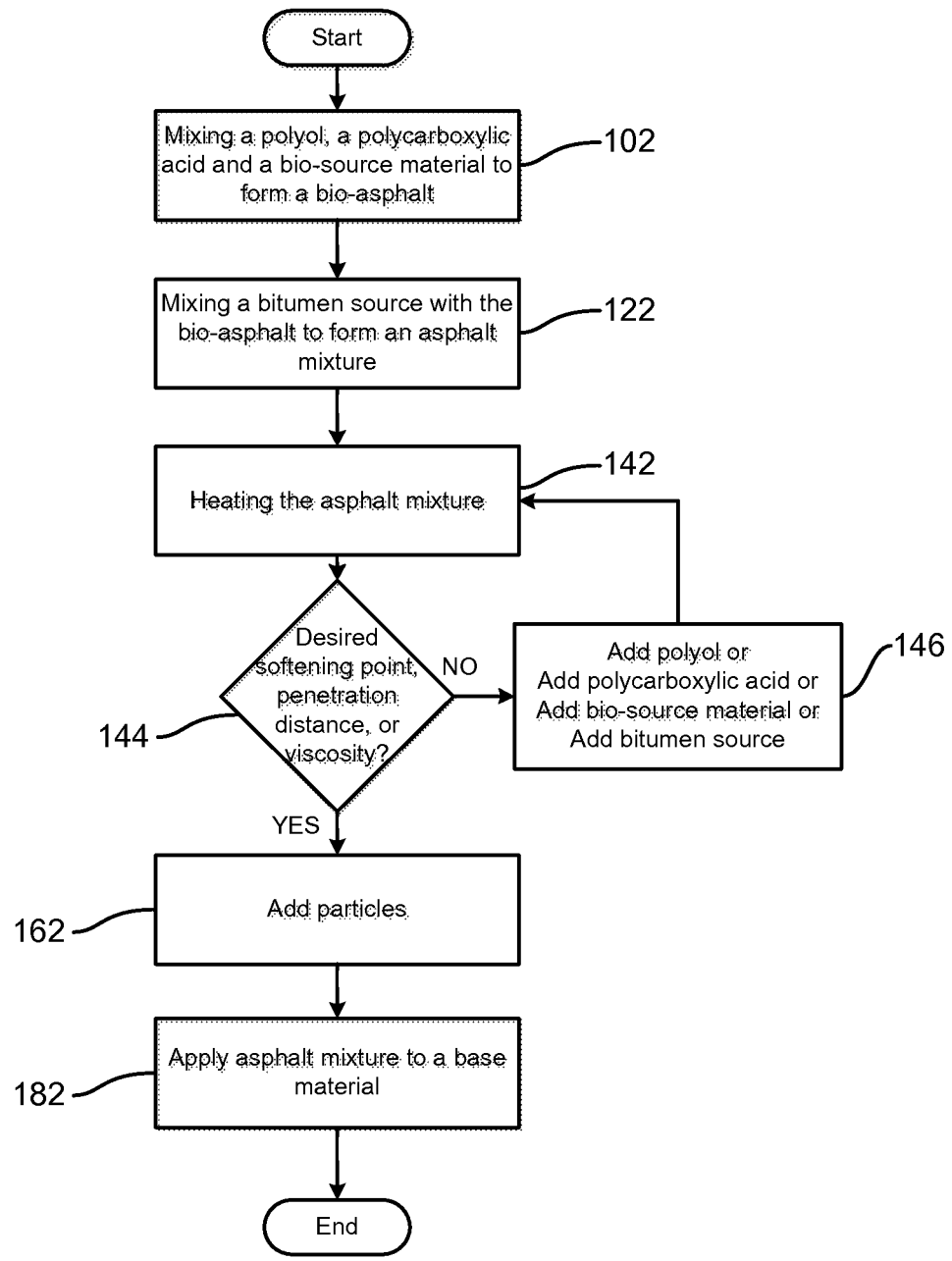
FIG. 1 includes a process flow diagram illustrating an exemplary method of forming an asphalt mixture.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "perimeter volume" is intended to mean a volume generally defined by outer surfaces of an object. For example, a fiberglass mat can include glass fibers in the form of an open structure. The outer surfaces of the fiberglass mat are used to determine the perimeter volume. The volume occupied by only the glass fibers within the fiberglass mat may be substantially less than the perimeter volume.

The term "principal surfaces," with respect to a roofing article or product, is intended to mean a pair of opposite surfaces of such roofing article or product, wherein one of the surfaces lies or would lie farther from a structure to which the roofing article or product is installed or intended to be installed, and the other surface of such roofing article or article lies or would lie closer to a structure to which the roofing article or article is installed or intended to be installed. When installed, the principal surface farther from the structure may be directly exposed to an outdoor environment, and the other principal surface may contact the structure or a different roofing product that lies between the other principal surface and the structure.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

An asphalt mixture or roofing product can include a bio-asphalt. The bio-asphalt can include a bio-source material. The asphalt mixture or roofing product can further include a bitumen source material different from the bio-asphalt. The asphalt mixture or roofing product can further include particles. In embodiments as described herein, the bio-asphalt in the roofing-grade asphalt mixture may allow use of the bitumen source material that may otherwise not be used in making roofing-grade asphalt. In a particular embodiment, the bitumen source material has a softening point of at least approximately 95° C. and a penetration distance (100 g at 25° C., ASTM D5) no greater than approximately 25 dmm, where "dmm" refers to a decimillimeter, or 0.1 mm. The bitumen source material may be a petroleum-based asphalt, coal tar, or the like. The bio-asphalt can be partially oxidized bio-source material, such as vegetable oil, cooking oil, animal fat, whether new or used (recycled), or any combination thereof. In a particular embodiment, the bio-asphalt includes a partially oxidized recycled vegetable oil. The bio-asphalt may further include a polyol. In one embodiment, the polyol includes a sugar, a sugar alcohol, a polyethylene glycol, or any combination thereof. In one particular embodiment, the sugar alcohol can include a glycol, a glycerine, a sorbitol, or any combination thereof. In yet one further embodiment, when a sugar is used as a polyol, the sugar can include a monosaccharide, a disaccharide, an oligosaccharide comprising between 3 and 20 monosaccharide units, or any combination thereof.

The bio-asphalt may include particles, such as limestone, talc, clay, coal fines, fly ash, gypsum, calcite, dolomite, or any combination thereof, and may be added before or after the oxidation is performed. The oxidation of the bio-source material can be performed in the presence of a catalyst. In a particular embodiment, the catalyst for oxidation is provided in a liquid form. An exemplary catalyst includes a metal salt. The metal of the metal salt can include cobalt, manganese, zirconium, vanadium, iron, calcium, nickel, copper, osmium, rhodium, rhenium, hafnium, or any combination thereof. Other suitable catalysts include metal driers such as metal carboxylates wherein the metal is selected from the group of cobalt, manganese, calcium, zirconium, cerium, zinc, vanadium, iron, aluminum, strontium, barium, nickel, osmium, rhodium, rhenium, hafnium, lithium, or any combination thereof. Non-limiting examples of such driers include cobalt octoate, cobalt linolate, vanadium naphthenate, vanadium octoate, zirconium octoate, cobalt naphthenate, lithium neodecanoate, cobalt octoate in methyl soyate, manganese linoleate, and combinations thereof.

The asphalt mixture can be applied to a base material during formation of a roofing product, such as a roofing shingle, a roofing membrane, another suitable roofing product that includes an asphalt mixture, or the like. If needed or desired, roofing granules, a parting agent, an adhesive, a release sheet, or any combination thereof may be applied to a surface of the combination of base material and roofing-grade asphalt.

The asphalt mixture can also be applied as a pavement or road surface material during road construction or road maintenance. If needed or desired, fillers, plasticizer, and other construction material, such as sand, gravel, rubber particles, or any combination thereof may be added.

The combination of the bio-asphalt, the bitumen source material different from the bio-asphalt, and the particles can form a roofing-grade asphalt mixture, which is also referred to as a filled coating. The roofing-grade asphalt mixture or filled coating can have a softening point of at least approximately 104° C. (220° F.), a penetration distance no greater than approximately 12 dmm, a viscosity of at least approximately 3000 cps at a temperature of 177° C. (350° F.), or any combination thereof. The roofing-grade asphalt mixture can be used to form a roofing product, such as a roofing shingle, a roofing membrane, or another suitable roofing product that includes a roofing-grade asphalt.

In embodiments as described herein, the use of bio-asphalt may allow an off-specification bitumen source material to be used and still form a roofing-grade asphalt mixture of acceptable quality. Further, the asphalt mixture or roofing product can provide a more environmentally acceptable solution to conventional roofing-grade asphalt that includes a petroleum-based asphalt as a sole bitumen source material. The roofing-grade asphalt can use a renewable source that is less likely to be irreversibly depleted. Similarly, fluctuations in the supply of such bio-source materials may be less affected by political or other factors. Still further, the roofing-grade asphalt mixture can reduce the amount of spent bio-based materials that may otherwise need to be disposed of by less environmentally acceptable means.

FIG. 1 includes a non-limiting, exemplary process flow that can be used to form an asphalt mixture or a roofing product using a bio-asphalt and a bitumen source material. In the embodiment of FIG. 1, the method includes preparing an alkyd resin from a bio-source material at block 102 by mixing a polyol and a bio-source material to form a bio-asphalt. In a particular embodiment, a polycarboxylic acid can be added to the bio-asphalt.

An alkyd resin includes a polyester generated from an oil or a fatty acid. The alkyd resin can be derived by an esterification or transesterification reaction of aromatic acids, aliphatic acids, or polycarboxylic acids and polyols in the presence of fatty acids. Esterification can occur when an organic acid $R_fCOOH$ and a hydroxyl group of an alcohol ROH condense into an ester bond thereby dispensing one molecule water per ester bond formed, as shown in the reaction below:

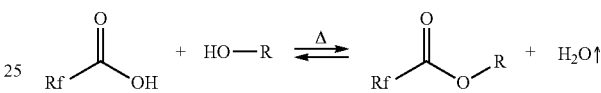

The above reaction is driven to the product side by the removal of water from the reaction system due to heating and/or insolubility of water in the reaction medium. Transesterifcation on the other hand is the replacement of one alkyl residue $R_1$ in an ester $R_fCOOR_1$ for another alkyl residue $R_2$ from an alcohol $R_2OH$ as disclosed below:

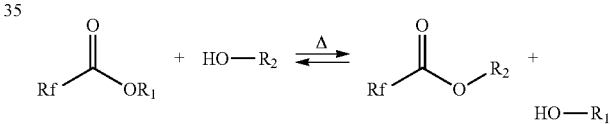

Similar to the esterification reaction, this reaction can be driven by the removal of a more volatile alcohol from the product side.

In embodiments, the alkyd resin can be prepared in the presence of a modifier. Modifier can include a fatty acid, a polycarboxylic acid, a polyacrylic acid, a polyacrylate comprising a copolymer, or any combination thereof. In one embodiment, the polycarboxylic acid can include a phthalic acid, an isophthalic acid, a terephthalic acid, a tetrahydrophthalic acid, a naphthalene dicarboxylic acid, or any combination thereof. Moreover, in further embodiments, the modifier can include an ethylene, a propylene, a styrene, an acrylic acid, a polymer or copolymer of an ethylene, a propylene, a styrene, an acrylic acid, a melamine formaldehyde resin, a phenolic resin, a polyisocyanate resin, an epoxy resin, or any combination thereof. In even further embodiments, the polyacrylate can be copolymerized with an ethylene, a propylene, a styrene.

In another embodiment, the bio-source material can be oxidized to achieve a desired softening point, penetration distance, viscosity, or other suitable characteristics. In an embodiment, the oxidation can be performed such that a combination of the bio-source material and the liquid catalyst has a softening point of at least approximately 88° C. (190° F.), at least approximately 90° C. (194° F.), or at least approximately 93° C. (200° F.). In another embodiment, the oxidation can be performed such that a combination of the bio-source material and the liquid catalyst has a softening point of not greater than approximately 110° C. (230° F.), not greater than approximately 105° C. (221° F.), or not greater than approximately 102° C. (215° F.).

The oxidation may be performed using air, nitrogen, oxygen, carbon dioxide, chlorine, another suitable oxidizing gas, or a combination of these gases at a time and temperature such that any needed or desired characteristic of the bio-source material or the bitumen source material (for example, softening point, penetration distance, viscosity, another suitable parameter, or any combination thereof) is achieved. In one embodiment, the oxidation can be performed in the absence of air. In a particular embodiment, the oxidation may be performed at a temperature in a range of approximately 100° C. (212° F.) to approximately 235° C. (455° F.). The oxidation of the bio-source material can be performed in the presence of a catalyst. In a particular embodiment, the catalyst for oxidation is provided in a liquid form. The oxidation can be performed until a needed or desired characteristic of the bio-asphalt, for example, softening point, penetration distance, viscosity, another suitable parameter, or any combination thereof is achieved. After reading this specification, skilled artisans will be able to determine the particular conditions used for the oxidation. For the purposes of this specification, a bio-asphalt material includes a partially oxidized vegetable oil, a partially oxidized cooking oil, a partially oxidized animal oil, a partially oxidized animal fat, or any combination thereof.

Referring to FIG. 1, the method can include mixing the partially oxidized bio-source material (bio-asphalt) with a bitumen source material to form the asphalt mixture, at block 122. At least part of the bitumen source material can include a bitumen source material that, by itself, may have unacceptable characteristics for roofing-grade asphalt, which is referred to as "off-spec asphalt." The bio-asphalt may allow the off-spec asphalt to be used in making an asphalt mixture having road surface grade or roofing grade that meets performance specifications and other desirable characteristics.

The bitumen source material can be different from the bio-asphalt. Such a bitumen source material can include a petroleum-based bitumen, coal tar, or another suitable bitumen source material. Unlike the bio-asphalt, the bitumen source material may be a non-renewable bitumen source material, as it may take many years (for example, hundreds of years, thousands of years, or longer) to form the bitumen source material. For a bitumen source material that has a softening point that is too high and a penetration distance that is too low, such a bitumen source material may not be oxidized. In a particular embodiment, the bitumen source material can include one or more than one bitumen source material, wherein at least one of the other bitumen source materials that may have unsuitable characteristics for a roofing-grade asphalt.

The off-spec bitumen source material may have a softening point that is too high and a penetration distance that is too low. In an embodiment, the off-spec asphalt bitumen source material can have a softening point of at least approximately 102° C. (215° F.) and a penetration distance no greater than approximately 20 dmm. In a particular embodiment, the softening point can be at least 105° C. (221° F.) or at least approximately 108° C. (226° F.). In another particular embodiment, the penetration distance may be no greater than approximately 17 dmm, no greater than approximately 14 dmm, or no greater than approximately 11 dmm. In yet another particular embodiment, the off-spec bitumen source material has a softening point no greater than approximately 110° C. (230° F.) and a penetration distance of at least approximately 10 dmm.

In a further embodiment, another bitumen source material may be used in addition to or in place of the off-spec bitumen source material. The other bitumen source material may meet the specifications for roofing-grade asphalt. The bio-asphalt can be used to extend the other bitumen source material.

Referring to block 122 of FIG. 1, the bio-asphalt and the bitumen source material may be combined to obtain a desired softening point, penetration distance, viscosity, or another suitable characteristic is obtained as previously described. In a particular embodiment, the bio-asphalt and the bitumen source material can be combined and mixed using a mechanical mixer. The mixing may be performed as low shear mixing or as high shear mixing. The low shear mixing can be in the form of blending, and the high shear mixing can be in the form of milling or dispersing.

In an embodiment, mixing can be performed at a temperature of at least approximately 175° C. (346° F.), at least approximately 180° C. (355° F.), or at least approximately 185° C. (364° F.). In another embodiment, mixing can be performed at a temperature of no greater than approximately 235° C. (455° F.), no greater than approximately 230° C. (446° F.), or no greater than approximately 225° C. (437° F.). The combination of the bio-asphalt and bitumen source material, without any filler material as described below, is hereinafter referred to as a raw coating material.

The roofing-grade asphalt mixture has a total bitumen content corresponding to the content of the bio-asphalt and the bitumen source material. In an embodiment, the bio-asphalt is at least approximately 5 wt %, at least approximately 11 wt %, or at least approximately 15 wt % of the total bitumen content. In another embodiment, the bio-asphalt is no greater than approximately 50 wt %, no greater than approximately 40 wt %, or no greater than approximately 35 wt % of the total bitumen content.

If needed or desired, an additive chemical can be used with the raw coating material. The additive chemical can include a process oil, a plasticizer, a polymer modifier, a hardener, another suitable compound, or any combination thereof. The process oil can include a napthenic oil, an aliphatic oil, or an aromatic oil, another suitable oil, or any combination thereof. Another exemplary compound can include a styrene-butadiene-styrene, a styrene-ethylene-butylene-styrene, a styrene-isoprene-styrene, an acrylonitrile-butadiene-styrene, an atactic polypropylene, an isotactic polypropylene, a high density polyethylene, an ethylene-polypropylene copolymer, another suitable plasticizer or polymeric compound, or any combination thereof. A thermoplastic olefin can be formed using a metallocene catalyst and include a block copolymer polypropylene, a polyethylene-propylene rubber, or another suitable material. Another type of plasticizer is non-drying or low drying alkyd compounds. Non-drying alkyd resins included resins having an oil content of more than 40% based on vegetable oils with saturated fatty acid content, short chain fatty acids or synthetic fatty acids. A transition between drying and non-drying character is dependent on vegetable oil content and character. It is possible for drying oil based alkyds with lower oil content to be non-drying based on a reduced capacity for oxidative drying. Alkyds with a nondrying character may be employed as plasticizers.

In an embodiment, the additive chemical may be added to the raw coating material. In another embodiment, the additive chemical can be added to the bio-asphalt or the bitumen source material before the raw coating material is formed. Typically, the additive chemical is in the form of a solid or a liquid at room temperature. When an additive chemical is used, the raw coating material may include substantially none of the additive chemical, at least approximately 5 weight % of the additive chemical, or at least approximately 10 weight % of the additive chemical. In another embodiment, the raw coating material may include no greater than approximately 40 weight %, no greater than approximately 30 weight %, or no greater than approximately 25 weight % of the additive chemical.

In one embodiment, the oxidation can be performed such that the combination of the bio-asphalt and the bitumen source material has a softening point no greater than approximately 120° C. (248° F.), no greater than approximately 115° C. (239° F.), or no greater than 112° C. (234° F.). In yet another embodiment, the combination of the bio-asphalt and the bitumen source material can have a penetration distance of less than approximately 40 dmm, less than approximately 30 dmm, or less than approximately 25 dmm. In another embodiment, the combination of the bio-asphalt and the bitumen source material can have a penetration distance of at least approximately 10 dmm, at least approximately 15 dmm, or at least approximately 18 dmm. In a further embodiment, the oxidation can be performed such that the viscosity of the combination of the bio-asphalt and bitumen source material, when measured at 177° C. (350° F.) is at least approximately 500 cps, at least approximately 600 cps, or at least approximately 700 cps. In another embodiment, the oxidation can be performed such that the viscosity of the bio-asphalt, when measured at 177° C. (350° F.) is at no greater than approximately 2000 cps, no greater than approximately 1700 cps, or no greater than approximately 1500 cps. In addition, the oxidation can be performed such that the viscosity of the combination of the bio-asphalt and bitumen source material, when measured at 204° C. (400° F.) is at least approximately 100 cps, at least approximately 150 cps, or at least approximately 200 cps. In another embodiment, the oxidation can be performed such that the viscosity of the bio-asphalt, when measured at 204° C. (400° F.) is at no greater than approximately 1000 cps, no greater than approximately 700 cps, or no greater than approximately 500 cps.

A determination is made whether desired properties, such as softening point, penetration distance, viscosity, or any other property (not illustrated) are obtained, at decision tree 144. The decision can be made dependent from the determination of one or more of properties. If the desired property or properties are obtained, the method continues with the finishing operations. If the desired property or properties are not obtained, such the process can be rerouted to previous steps. In an embodiment, an additional amount of polyol, polycarboxylic acid, bio-source, or bitumen source material can be added to the asphalt mixture and the asphalt mixture can undergo further heating. In another embodiment (not illustrated), a bitumen source, either the same or different from the bitumen source already added to the asphalt mixture can be added. In yet another embodiment (not illustrated), after determining an undesired property, the mixture can undergo further heating without adding any other material.

Referring to block 162 of FIG. 1, particles can be combined with asphalt mixture, and if present, the additive chemical, to form a roofing-grade asphalt mixture also referred to as a filled coating. Such particles can also be referred to as filler and can include limestone, talc, clay, coal fines, fly ash, gypsum, calcite, dolomite, another suitable filler material, or any combination thereof. In yet another embodiment, the particles may be added to the bio-source material, and if present, the additive chemical. In another embodiment, the particles can be added to the bio-asphalt or the bitumen source material (after oxidation of the bitumen source material), before the raw coating material is formed. In a further embodiment, the particles can be added to the asphalt mixture or also referred to as the raw coating material, before the additive chemical, if present, is combined with the raw coating material. The combination of the raw coating material, the particles, and if present, the additive chemical is referred to as the filled coating material. In a particular embodiment, the roofing grade asphalt mixture is the filled coating material, and can include an additional material if needed or desired for a particular application.

In a shingle embodiment, the roofing-grade asphalt mixture can include at least approximately 45 weight % of particles, at least approximately 50 weight % of particles, or at least approximately 55 weight % of particles. In another shingle embodiment, the roofing-grade asphalt mixture may include no greater than approximately 80 weight % of particles, no greater than approximately 75 weight % of particles, or no greater than approximately 70 weight % of particles. In a membrane embodiment, the roofing-grade asphalt mixture may include at least approximately 5 weight % of particles, or at least approximately 10 weight % of particles. In another membrane embodiment, the roofing-grade asphalt mixture may include no greater than approximately 70 weight % of particles, no greater than approximately 50 weight % of particles, or no greater than approximately 40 weight % of particles.

The method can further include applying the mixture to a base material, at block 182 of FIG. 1. For roofing-grade asphalt mixture, the base material can include a fiberglass mat, a cellulose-based material, a polymer fiber material, or the like. In a particular embodiment, the cellulose-based material can include wood or paper fibers. In another particular embodiment, the polymer fiber material can include a polyester. In a particular embodiment, the base material includes an open structure. The open structure can allow the roofing-grade asphalt mixture to flow within the open structure. The open structure can be in the form of pores, channels, interstitial openings within a matrix, another suitable void, or any combination thereof. Applying the roofing-grade asphalt mixture can be performed using any one or more methods. In an embodiment, the base material can be submerged into the roofing-grade asphalt mixture. In another embodiment (not illustrated), the open structure of the base material can be filled by spraying or coating the roofing-grade asphalt mixture onto the base material.

When the base material includes an open structure, the open structure may be partly or substantially completely filled with asphalt mixture. The outermost portions of the base material may or may not be exposed after the asphalt mixture is applied. In an embodiment, the volume of the asphalt mixture is greater than a perimeter volume of the base material, and in another embodiment, the volume of the asphalt mixture is no greater than the perimeter volume of the base material. In a particular embodiment, a portion of a principal surface of the base material may be exposed; however, most of the structure or volume of the base material may be embedded within or saturated with the asphalt mixture.

The method further includes finish processing of the asphalt product. Finishing can include one or more operations. For a roofing-grade asphalt mixture or a filled coating, in an embodiment, roofing granules can be applied to a surface of the coated base material. The roofing granules can be used for ultraviolet radiation protection, coloration, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof.

In another embodiment (not illustrated in FIG. 1), the roofing granules can also include one or more surface coatings over the inert base particles. A surface coating can cover at least approximately 75% of the surface of the inert base particle, and may cover at least approximately 90% of the surface of the inert base particle. In a particular embodiment, the surface coating continuously covers the surface of the inert base particle, and such surface coating layer has a substantially uniform thickness. If more than one surface coating is used, a subsequent surface coating may cover an underlying surface coating to the extent described with respect to the inert base particles.

If more than one surface coating is used, a surface coating closer to the inert base particles can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic, polyurethane, polyester, silicone, polyamide, or any combination thereof. One or more additional organic binders of the same or different composition can be used.

A surface coating can include a solar reflective material that helps to reflect at least some of the solar energy. For example, UV radiation can further polymerize, harden, or otherwise degrade the asphalt within the roofing product being fabricated. A solar reflective material can include titanium dioxide, zinc oxide, or the like. Alternatively, the solar reflective material can include a polymeric material. In an embodiment, a polymer can include a benzene-modified polymer (e.g., copolymer including a styrene and an acrylate), a fluoropolymer, or any combination thereof. Other solar reflective materials are described in U.S. Pat. No. 7,241,500 and U.S. Publication Nos. 2005/0072110 and 2008/0220167, all of which are incorporated by reference for their teachings of materials that are used to reflect radiation (e.g., UV, infrared, etc.) from the sun.

A surface coating can include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric binder. The polymeric binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. Alternatively, the binder may be a solvent-based surface coating, a radiation curable surface coating, or a two-part reactive surface coating. These alternative surface coatings may likewise include any of previously described polymeric materials.

The same or different algaecide or other biocide can be used within different surface coatings. An algaecide or another biocide is not required to be present in every surface coating of the roofing granules. In another particular embodiment, the algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, silica encapsulated metal flake, or a metal nitride.

An additional surface coating may be used for a different purpose not described herein. For example, the surface coating can include a different oxide, nitride, oxynitride, carbide, oxycarbide, or any combination thereof. After reading this specification, skilled artisans will be able to determine if an additional function or purpose is to be served by the roofing granules and whether an existing surface coating or material within a surface coating serves such a function or purpose or if an additional surface coating or an additional material within an existing surface coating would be needed or desired.

In addition to or in place of applying roofing granules, another finishing operation can be performed. For example, after the roofing granules are applied, another surface coating (not illustrated), similar to any single or combination of binders and surface coatings previously described with respect to the roofing granules, may be coated onto the roofing product after roofing granules have been applied. Such binder or surface coating may have a solar reflective property, an algaecide or other biocide, a pigment or another appearance modifier, or any combination thereof as previously described. Alternatively, a sheet or film may be applied to the surface of the coated base material rather than granules. Such a sheet or film may impart properties of weatherability, solar reflectance, antisoiling, antimicrobial protection, or the like.

In another finishing operation, a parting agent can be applied to a surface of the roofing product. The parting agent helps to keep the roofing product from sticking to itself or sticking to other manufacturing equipment, such as the equipment used in the web handling or cutting operation. The parting agent can include particles of sand, talc, limestone, slag, another relatively inert material, or any combination thereof. If the roofing product includes roofing granules, the parting agent is applied to the surface of the roofing product opposite the roofing granules. After applying the roofing granules, parting agent, or both are applied, the roofing product can be processed during a stamping or cutting operation to achieve a desired shape for a finished roofing product. In particular, the finished roofing product is in the form of a roofing shingle.

In another embodiment, a membrane-type roofing product can be manufactured. The membrane-type roofing product has significant differences that are mostly seen with the finishing operations of the manufacturing process because the membrane-type roofing product is typically a self-adhesive product, although this is not a requirement. The finishing operations for a membrane-type roofing product can vary depending on the particular application.

In a particular embodiment, a principal surface of the membrane-type roofing product can be directly exposed to an outdoor environment. For this particular application, roofing granules, a surface coating, a sheet, a film, a laminated structure, or a combination thereof may be used. When the membrane-type roofing product is used as part of an underlayment or as a lower layer of a built-up roofing system, roofing granules may or may not be used. The membrane-type roofing product may be applied directly to a roof deck as a base sheet or an underlayment. In this particular application, an adhesive can be used to provide a good seal to help reduce the likelihood of water damage from ice dams. Accordingly, the finishing operation includes applying adhesive and a release sheet to the roofing product. The adhesive can include a tackifier, such as polyvinylbutyral, a pressure sensitive adhesive, a styrene-isopropene-styrene (SIS) copolymer, a styrene-butadiene-styrene (SBS) copolymer, another suitable compound, or any combination thereof. A pressure sensitive adhesive can include a silicone, a rubber, an acrylate, a bituminous adhesive, or the like. In a particular embodiment, a styrene-isoprene-styrene rubber composition can be used. A release sheet can be dispensed from a supply roll to the adhesive side to form the roofing product.

In an alternative embodiment (not illustrated), an adhesive modifier can be added to the roofing-grade asphalt that is first applied to the base material, or to an asphalt coating applied to the surface of the roofing product that will be closest to a roofing structure. Thus, a separate adhesive application operation may be eliminated. In this particular embodiment, the release sheet would be applied to the surface having the adhesive-modified roofing-grade asphalt.

In still another embodiment, no finishing operation may be performed, only one or some, but not all, of the previously-described finishing operations may be performed, or another finishing operation may be performed in addition to or in place of another finishing operation as previously described. Alternatively, a take-up roll may be used instead of or before performing the stamping or cutting operation. After reading this specification, skilled artisans will be able to configure a manufacturing line for the particular roofing product being formed.

After reading this specification, skilled artisans will appreciate that many other roofing products can be made using the concepts as described herein. The particular materials, coatings, processes, and other parameters can be tailored for the roofing products that are needed or desired.

Figure 2:
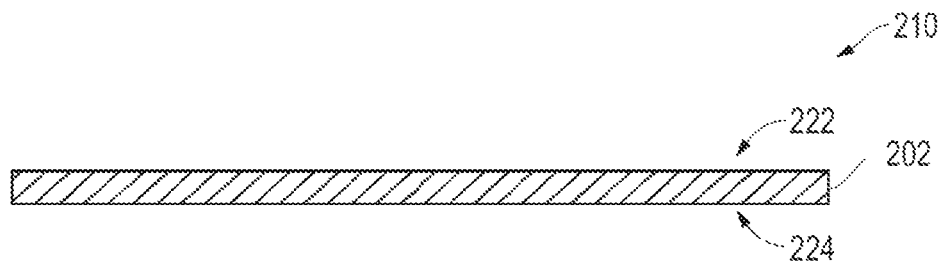
FIG. 2 includes an illustration of a cross-sectional view of a roofing product in accordance with an embodiment.

FIG. 2 includes an illustration of a cross-sectional view of the finished roofing product 210. The finished roofing product 210 includes a coated base material 202 that includes any of the roofing-grade asphalt mixtures as previously described. Roofing granules 222 are applied to a principal surface of the coated base material 202, and a parting agent 224 is applied to an opposite principal surface of the coated based material 202.

Figure 3:
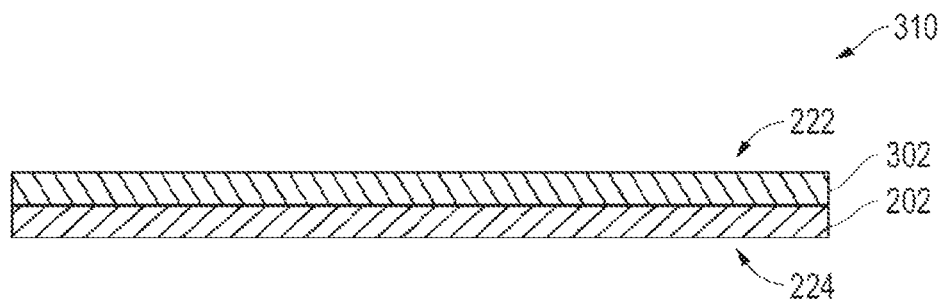
FIG. 3 includes an illustration of a cross-sectional view of a roofing product in accordance with another embodiment.

FIG. 3 includes an illustration of a cross-sectional view of the finished roofing product 310. The finished roofing product 310 includes the coated base material 202, roofing granules 222 and parting agent 224 as previously described with respect to the roofing product 210. Unlike the roofing product 210, the roofing product 310 includes a roofing-grade asphalt coating 302 that is disposed between the coated base material 202 and the roofing granules 222. The roofing-grade asphalt coating 302 can include any of the roofing-grade asphalt mixtures as previously described. Thus, the roofing-grade asphalt coating 302 may have substantially the same composition or a different composition as compared to the roofing-grade asphalt mixture within the coated base material 202.

In another embodiment, the roofing-grade asphalt coating 302 can include a conventional roofing-grade asphalt composition that is substantially free of a bio-source material. In a further embodiment, the asphalt compositions of the coated base material 202 and roofing-grade asphalt coating 302 can be reversed. In particular, the coated base material 202 can include a conventional roofing-grade asphalt composition, and the roofing-grade asphalt coating 302 can include the roofing-grade asphalt mixture that includes the bio-asphalt.

Figure 4:
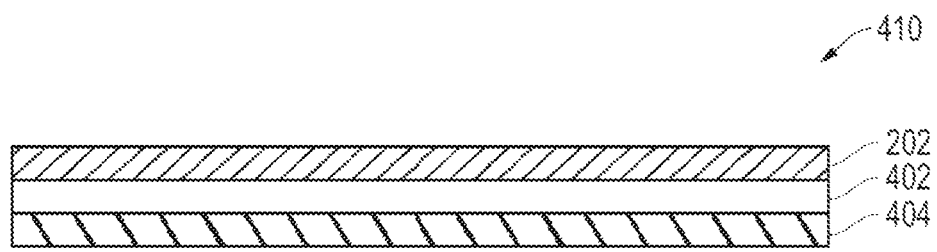
FIG. 4 includes an illustration of a cross-sectional view of a roofing product in accordance with a further embodiment.

FIG. 4 includes an illustration of a cross-sectional view of the finished roofing product 410. The finished roofing product 410 includes the coated base material 202 as previously described with respect to the roofing product 210. Unlike the roofing product 210 that has the parting agent 224, the roofing product 410 includes a layer of adhesive 402 and a release sheet 404. The roofing product 410 can be a roofing membrane. When the roofing product 410 is an underlayment, roofing granules may not be present. When the roofing product 410 has a principal surface that is exposed to outdoor conditions, roofing granules (not illustrated in FIG. 4) may be present along the principal surface opposite that of the layer of adhesive 402.

After reading this specification, skilled artisans will appreciate that FIGS. 2 to 4 illustrate only a few potential roofing products that can be formed with a roofing-grade asphalt mixture that includes a bio-asphalt. Other roofing products can be made without departing from the concepts as described herein.

When properly prepared, the roofing-grade asphalt mixture can include bio-asphalt and still meet the stringent requirements in order to produce roofing products that meet or exceed specifications. In one embodiment, an alkyd can be prepared from the bio-source material prior to the addition of the bitumen source. The bio-asphalt can be used to replace at least part of other bitumen source materials, and in particular petroleum-based asphalt. Further, the bio-asphalt can be used to help recover an off-spec bitumen source material that may otherwise have been discarded. A wider variety of bitumen source materials can be used. In addition, the cost of fabricating roofing products may not fluctuate as much, and supply concerns may be less, as bio-asphalt may be produced domestically.

The embodiments as described herein can be used to produce a roofing product that can include a bio-source material that may be new or used. In an embodiment, the bio-source can be used oils, such as used vegetable oil, used cooking oil, used animal oil, used animal fat, or other materials from other industries. For example, significant amounts of vegetable and animal oils are used or generated from restaurants. Such organic materials from biological sources may be of limited value to others, as such materials may not be suitable for use in producing fuel-grade products, paving grade asphalt, or the like.

In particular, the bio-source material can be further processed to form an alkyd composition useful as an additive or an asphaltic coating composition, separately or in situ with an bio-asphalt or asphaltic composition suitable for formulation into a roofing grade asphalt that can be processed by conventional means into a roofing product. Roofing-grade or pavement-grade asphalt has different criteria, so materials that can be recycled or used for other industries may be used to form roofing-grade asphalt. Thus, organic materials from biological sources, whether new or used, that may otherwise be of no significant commercial use in other industries may be used, recycled, processed, or the like for use in making bio-asphalt for a roofing-grade asphalt mixture.

Further, fabrication of roofing or pavement products is not significantly altered. The handling and application of the roofing-grade asphalt mixture and further fabrication of the roofing product can be substantially identical to that used for roofing products that include conventional roofing-grade asphalt. Likewise, the handling and application of the pavement-grade asphalt mixture and further fabrication of the pavement product can be substantially identical to that used for pavement products that include conventional pavement-grade asphalt. Thus, significantly different equipment and processes may not need to be used or integrated into an existing fabrication line.

EXAMPLES

Example 1

Adding a Pre-made Alkyd to the Asphalt

Roofing grade asphalt flux was oxidized utilizing a standard air blowing procedure to a softening point of 211° F. In a control experiment, blown asphalt was mixed with filler to make filled coating. In another experiment, same air blown asphalt was mixed with long oil alkyd resin and filler to make filled coating. 10% of asphalt was substituted with Duramac HS 57-5816 long oil alkyd resin. Physical properties of both filled coatings were compared. Filled coating made with alkyd resin showed lower viscosity, increase penetration and much improved flexibility. Table 1 includes data showing the physical properties of filled coating made with and without alkyd resin.

TABLE 1

Physical properties of filled coating made with high solids long oil alkyd resin HS 57-5816

| Sample | Asphalt Raw Coating | Filled Coating | |
|---|---|---|---|
| | | Control | Alkyd Resin (Duramac HS 57-5816) |
| Asphalt Supplement (% of asphalt) | | 0.0% | 10% |
| Filler | | 68% | 68% |
| Softening point (F.) | 211 | 249 | 241 |
| Penetration (dmm) | 20 | 12 | 21 |
| Viscosity (cp) @ 400 F. | | 4700 | 3000 |
| @ 415 F. | | 3400 | 2500 |
| @ 430 F. | | 2825 | 2200 |

In a separate experiment, 10% of regular asphalt was substituted with long oil alkyd Duramac HS 201-2516 and a filled coating was prepared. Filled coating made with alkyd resin showed similar reduction in viscosity and hardness. A drying agent can be used to further adjust properties of filled coating made with alkyd resin.

TABLE 2

Physical properties of filled coating made with high solids long oil alkyd resin HS 201-2516

| Sample | Asphalt Raw Coating | Filled Coating | |
|---|---|---|---|
| | | Control | Alkyd resin (Duramac HS 201-2516) |
| Asphalt Supplement (% of asphalt) | | 0.0% | 10.0% |
| Filler | | 69% | 69% |
| Softening point (F.) | 207 | 250 | 226 |
| Penetration (dmm) | 20 | 6 | 12 |
| Viscosity (cp) @ 400 F. | | 5550 | 2675 |
| @ 415 F. | | 4017 | 2030 |
| @ 430 F. | | 3025 | 1758 |

Many different aspects and embodiments are possible. Some of those aspects and embodiments are described herein. After reading this specification, skilled artisans will appreciate that those aspects and embodiments are only illustrative and do not limit the scope of the present invention.

A method of forming an asphalt mixture can include mixing a polyol with a bio-source material to form a bio-asphalt. The method can further include mixing the bio-asphalt with a bitumen source different from the bio-asphalt to form an asphalt mixture. The method can further include adding a modifier during the mixing of the polyol with the bio-source material further includes. The modifier can include a fatty acid, a polycarboxylic acid, a polyacrylic acid, a polyacrylate comprising a copolymer, or any combination thereof. The polycarboxylic acid can include a phthalic acid, an isophthalic acid, a terephthalic acid, a tetrahydrophthalic acid, a naphthalene dicarboxylic acid, or any combination thereof. In another embodiment, the modifier can include an ethylene, a propylene, a styrene, an acrylic acid, a polymer or copolymer comprising an ethylene, a propylene, a styrene, an acrylic acid, a melamine formaldehyde resin, a phenolic resin, a polyisocyanate resin, an epoxy resin, or any combination thereof.

The method can further include heating the asphalt mixture to at least about 100° C., such as at least about 120° C., at least about 140° C., or at least about 180° C. The heating can include heating the asphalt mixture to not greater than about 260° C., such as not greater than about 240° C., not greater than about 220° C., not greater than about 200° C., or not greater than about 180° C.

In embodiments, the polyol can include a sugar, a sugar alcohol, a polyethylene glycol, or any combination thereof. The sugar alcohol can include a glycol, a glycerine, a sorbitol, or any combination thereof. The sugar can include a monosaccharide, a disaccharide, or any combination thereof.

In embodiments, the bio-source material can include an oil. The oil can include cooking oil, vegetable oil, animal fat, or any combination thereof. The oil can also include recycled cooking oil, recycled vegetable oil, recycled animal fat, or any combination thereof. In yet another embodiment, the oil can be partially oxidized.

In one further embodiment, the method can further include adding an oxidizer to the bio-asphalt. The oxidizer can include oxygen, chlorine, hypochlorous acid (HOCl), a hypochlorite, a peroxide, or any combination thereof. In one embodiment, the method can further include mixing air into the bio-asphalt. In another embodiment, air can be blown into the bio-asphalt. The blowing can occur at an earlier stage as well. For example, oxidizer can be added or air can be blown into the bio-source material before adding a polyol. Likewise oxidizer can be added or air can be blown after polyol has been added, or after the bio-asphalt has been mixed with the bitumen source, or at any combination of these stages. Likewise an oxidizer can be added or air can be blown to the bitumen source prior mixing with the bio-asphalt. Conclusively, oxidizer can be added or air can be blown into the mix at any stage of the process, either separately or concurrently.

In embodiments, the bitumen source applied in the method can include a petroleum-based asphalt. Accordingly, the method can result in an asphalt mixture which has a softening point of at least approximately 95° C., a penetration distance no greater than approximately 25 dmm, a viscosity of at least approximately 500 cps at a temperature of 177° C., or any combination thereof. According to another embodiment, the asphalt mixture can have a softening point of not greater than approximately 120° C., a penetration distance no greater than approximately 40 dmm, a viscosity of not greater than approximately 2000 cps at a temperature of 177° C., or any combination thereof. The softening point of the asphalt mixture can be at least approximately 100° C., at least approximately 103° C., or at least approximately 106° C. In yet another embodiment, the softening point of the asphalt mixture is not greater than approximately 120° C., not greater than approximately 115° C., or not greater than approximately 112° C.

In one embodiment, the bitumen source material has a softening point of at least approximately 102° C. The bitumen source material can further have a penetration distance no greater than approximately 20 dmm. In another embodiment, the softening point of the bitumen source material can be at least approximately 105° C., such as at least approximately 108° C. The penetration distance of the bitumen source material can be no greater than approximately 17 dmm, such as no greater than approximately 14 dmm, or no greater than 11 dmm. In one embodiment, the softening point of the bitumen source material can be no greater than approximately 110° C. and the penetration distance of the bitumen source material is at least approximately 10 dmm.

In one further embodiment, the asphalt mixture can have a total bitumen content, wherein the bio-source material can be at least approximately 5 wt %, such as at least approximately 11 wt %, or at least approximately 15 wt % of the total bitumen content. In another embodiment, the asphalt mixture can have a bitumen content no greater than approximately 50 wt %, such as no greater than approximately 40 wt %, or no greater than approximately 35 wt %.

In yet another embodiment, the mixing of the bio-asphalt with the bitumen source can be performed at a temperature of at least approximately 175° C., such as at least approximately 180° C., or at least approximately 185° C. Further, the mixing of the bio-asphalt with the bitumen source can be performed at a temperature no greater than approximately 235° C., such as no greater than approximately 230° C., or no greater than approximately 225° C. In one embodiment, the asphalt mixture has a viscosity at 177° C. of at least approximately 500 cps, such as at least approximately 600 cps, or at least approximately 700 cps. Moreover at 177° C., the asphalt mixture can have a viscosity no greater than approximately 2000 cps, such as no greater than approximately 1700 cps, or no greater than approximately 1500 cps.

In another embodiment, the method can further comprise mixing particles with the polyol, the bio-source material, the bio-asphalt, the bitumen source, or the asphalt mixture. In one particular embodiment, the particles can include limestone, talc, clay, coal fines, gypsum, calcite, dolomite, fly ash, or any combination thereof.

In one particular embodiment, the asphalt mixture of the method is a roofing-grade asphalt mixture. In another embodiment, the method can further comprise esterifying or transesterifying the polyol with the bio-source material. The esterifying of transesterifying can occur in the presence of the bitumen source. In another embodiment, the esterifying of transesterifying can occur before the mixing of the bitumen source. In another embodiment, the method can include esterifying or transesterifying the polyol with the bio-source material, the modifier, or a combination thereof.

Another aspect includes a method of forming a roofing product comprising. The method can include mixing a polyol with a bio-source material to form a bio-asphalt. The method can further include mixing the bio-asphalt with a bitumen source different from the bio-asphalt and particles to form an asphalt mixture. Moreover, the method can include applying the asphalt mixture to a base material. In one embodiment, the mixing of the polyol with the bio-source material can further include adding a modifier. In embodiments, the modifier can include a fatty acid, a polycarboxylic acid, a polyacrylic acid, a polyacrylate comprising a copolymer, or any combination thereof. In one particular embodiment, the polycarboxylic acid can include a phthalic acid, an isophthalic acid, a terephthalic acid, a tetrahydrophthalic acid, a naphthalene dicarboxylic acid, or any combination thereof. In another embodiment, the modifier can include an ethylene, a propylene, a styrene, an acrylic acid, a polymer or copolymer comprising an ethylene, a propylene, a styrene, an acrylic acid, a melamine formaldehyde resin, a phenolic resin, a polyisocyanate resin, an epoxy resin, or any combination thereof.

In one embodiment, the polyol can include a sugar, a sugar alcohol, a polyethylene glycol, or any combination thereof. The sugar alcohol can include a glycol, a glycerine, a sorbitol, or any combination thereof.

In another embodiment, the bio-based material can include an oil, the oil including cooking oil, vegetable oil, animal fat, or any combination thereof. Moreover, the oil can include recycled cooking oil, recycled vegetable oil, recycled animal fat, or any combination thereof. In one embodiment, the oil can be partially oxidized. In one further embodiment, the method can further include adding an oxidizer to the bio-asphalt. The oxidizer can include oxygen, chlorine, hypochlorous acid (HOCl), a hypochlorite, a peroxide, or any combination thereof.

In one particular embodiment, the bitumen source comprises a petroleum-based asphalt. In another embodiment, the asphalt mixture can have a softening point of at least approximately 95° C. The asphalt mixture can further have a penetration distance no greater than approximately 25 dmm. Moreover, the asphalt mixture can have a viscosity of at least approximately 500 cps at a temperature of 177° C. In one embodiment, the bitumen source material can have a softening point of at least approximately 102° C. and a penetration distance no greater than approximately 20 dmm. In another embodiment, the softening point of the bitumen source material is at least approximately 105° C. or at least approximately 108° C. Yet in one further embodiment, the penetration distance of the bitumen source material can be no greater than approximately 17 dmm, such as no greater than approximately 14 dmm, or no greater than 11 dmm. In another embodiment, the softening point of the bitumen source material is no greater than approximately 110° C., and the penetration distance of the bitumen source material is at least approximately 10 dmm. In yet one further embodiment, the softening point of the asphalt mixture can be at least approximately 100° C., such as at least approximately 103° C., or at least approximately 106° C. Moreover, the softening point of the asphalt mixture can be no greater than approximately 120° C., no greater than approximately 115° C., or no greater than approximately 112° C.

In another embodiment, the asphalt mixture has a total bitumen content, wherein the bio-source material can be at least approximately 5 wt %, such as at least approximately 11 wt %, or at least approximately 15 wt % of the total bitumen content. In one embodiment, the asphalt mixture can have a bitumen content no greater than approximately 50 wt %, such as no greater than approximately 40 wt %, or no greater than approximately 35 wt %.

Moreover, the mixing of the bio-asphalt with the bitumen source can be performed at a temperature of at least approximately 175° C., such as at least approximately 180° C., or at least approximately 185° C. In another embodiment, the mixing of the bio-asphalt with the bitumen source is performed at a temperature of no greater than approximately 235° C., such as no greater than approximately 230° C., or no greater than approximately 225° C. In yet one further embodiment, the asphalt mixture can have a viscosity at 177° C. of at least approximately 500 cps, such as at least approximately 600 cps, or at least approximately 700 cps. Conversely, at 177° C., the asphalt mixture can have a viscosity no greater than approximately 2000 cps, such as no greater than approximately 1700 cps, or no greater than approximately 1500 cps.

In one embodiment, the particles of the asphalt mixture can include limestone, talc, clay, coal fines, gypsum, calcite, dolomite, fly ash or any combination thereof. In yet another embodiment, the base material of the roofing product can include a fiberglass mat, a cellulose-based material, or a polymer fiber mat. In a particular embodiment, the fiberglass mat, the cellulose-based material, or the polymer fiber mat can be woven, non-woven, knitted scrim, or combination thereof. In yet one further embodiment, the cellulose-based material can include wood or paper fiber. Moreover, if the base material is polymer based, the polymer can include a polyester.

In embodiment, applying the asphalt mixture to the base material can be performed such that the asphalt mixture substantially fills an open structure of the base material. In other embodiments, applying the asphalt mixture to the base material can be performed such that at least 50% of the asphalt material is outside of an open structure of the base material. In one embodiment, the roofing product comprises a roofing shingle, and a particle content is less than 80 weight % of the asphalt mixture. In one further embodiment, the particle can be added to the roofing product in an amount of approximately 64 weight % to approximately 70 weight % of the asphalt mixture. In yet one embodiment, the roofing product can include a membrane-type roofing product, and a particle content is less than 60 weight % of the asphalt mixture.

In one embodiment, the method can further include adding a plasticizer. The plasticizer can be added to the bio-asphalt or to the asphalt mixture. In another embodiment, the method can further include applying roofing granules to an exposed surface of the roofing product after applying the asphalt mixture to the base material. In another embodiment, the method can further include applying a release sheet to an exposed surface of the roofing product after applying the asphalt mixture to the base material. In one particular embodiment, the method can be performed such that the roofing product is in a form of a roofing shingle. In another particular embodiment, the method can be performed such that the roofing product is in a form of a roofing membrane. In one further embodiment, the asphalt mixture of the method can include roofing grade asphalt mixture.

According to another aspect of the invention, a roofing grade asphalt mixture can include a bio-asphalt. The bio-asphalt can include an alkyd. The alkyd can include a reaction product of a polyol and a bio-source material. Moreover the roofing grade asphalt mixture can include a bitumen source material. The bitumen source material can be different from the bio-asphalt. Further, the roofing grade asphalt mixture can include particles. In another embodiment, the roofing grade asphalt mixture can further include the reaction product of the polyol, the bio-source material, and a modifier. The modifier can include a fatty acid, a polycarboxylic acid, a polyacrylic acid, a polyacrylate comprising a copolymer, or any combination thereof. In a particular embodiment, polycarboxylic acid includes a phthalic acid, an isophthalic acid, a terephthalic acid, a tetrahydrophthalic acid, a naphthalene dicarboxylic acid, or any combination thereof. In another embodiment, the modifier can include an ethylene, a propylene, a styrene, an acrylic acid, a polymer or copolymer comprising an ethylene, a propylene, a styrene, an acrylic acid, a melamine formaldehyde resin, a phenolic resin, a polyisocyanate resin, an epoxy resin, or any combination thereof.

In another embodiment, the roofing grade asphalt mixture can have bitumen source material with a softening point of at least approximately 95° C. and a penetration distance no greater than approximately 25 dmm. The softening point of the bitumen source can be at least approximately 105° C. or at least approximately 108° C. In yet another embodiment, the penetration distance of the bitumen source material can be no greater than approximately 17 dmm, no greater than approximately 14 dmm, or no greater than 11 dmm. Furthermore, the softening point of the bitumen source material can be no greater than approximately 110° C., and the penetration distance of the bitumen source material is at least approximately 10 dmm. In one further embodiment, the bitumen source material comprises a petroleum-based asphalt. In In yet another embodiment, the roofing grade asphalt mixture can have a softening point of at least approximately 104° C., such as a penetration distance no greater than approximately 12 dmm. Moreover, the roofing grade asphalt mixture can have a viscosity of at least approximately 3000 cps at a temperature of 177° C.

In one embodiment, the bio-source material can include an oil, the oil including cooking oil, vegetable oil, an animal oil, recycled cooking oil, or any combination thereof. Further, the oil can include recycled vegetable oil, recycled animal fat, any partially oxidized oil therefrom, or any combination thereof. Moreover, the oil can be partially oxidized.

In one further embodiment, the roofing grade asphalt mixture can have a softening point of at least approximately 100° C., at least approximately 103° C., or at least approximately 106° C. Further, the softening point can be no greater than approximately 120° C., no greater than approximately 115° C., or no greater than approximately 112° C.

In yet another embodiment, the roofing grade asphalt mixture can further have a total bitumen content, wherein a bio-based oxidized material is at least approximately 5 wt %, at least approximately 11 wt %, or at least approximately 15 wt % of the total bitumen content. Moreover, the bitumen content can be no greater than approximately 50 wt %, no greater than approximately 40 wt %, or no greater than approximately 35 wt %. Moreover, the roofing grade asphalt mixture can have a viscosity at 177° C. of at least approximately 3500 cps, at least approximately 3700 cps, or at least approximately 3900 cps. Further, the roofing grade asphalt mixture can have a viscosity at 177° C. of no greater than approximately 4500 cps, no greater than approximately 4400 cps, or no greater than approximately 4300 cps.

In one embodiment, the particles of the roofing grade asphalt mixture can include limestone, talc, clay, coal fines, gypsum, calcite, dolomite, fly ash, or any combination thereof. In one embodiment, the particle content can be of less than 80 weight % of the roofing-grade asphalt mixture. Furthermore, the particle content can include approximately 64 weight % to approximately 70 weight % of the roofing-grade asphalt mixture. In another embodiment, the roofing grade asphalt mixture can further include a plasticizer.

In one further aspect, a roofing product can include a base material and a roofing-grade asphalt mixture. The roofing-grade asphalt mixture can include a bio-asphalt. The bio-asphalt can include an alkyd. The alkyd can include a reaction product of a polyol and a bio-source material. The roofing-grade asphalt mixture can further include a bitumen source material different from the bio-asphalt. The roofing product can further include particles. In one embodiment, the reaction product can include the polyol, the bio-source material, and a modifier. The modifier can include a fatty acid, a polycarboxylic acid, a polyacrylic acid, a polyacrylate comprising a copolymer, or any combination thereof. In one particular embodiment, the polycarboxylic acid can include a phthalic acid, an isophthalic acid, a terephthalic acid, a tetrahydrophthalic acid, a naphthalene dicarboxylic acid, or any combination thereof. In another embodiment, the modifier can include an ethylene, a propylene, a styrene, an acrylic acid, a polymer or copolymer comprising an ethylene, a propylene, a styrene, an acrylic acid, a melamine formaldehyde resin, a phenolic resin, a polyisocyanate resin, an epoxy resin, or any combination thereof.

In another embodiment, the bitumen source material can have a softening point of at least approximately 95° C. and a penetration distance no greater than approximately 25 dmm. The softening point of the bitumen source can be at least approximately 105° C. or at least approximately 108° C. The penetration distance of the bitumen source material can be no greater than approximately 17 dmm, no greater than approximately 14 dmm, or no greater than 11 dmm. The softening point of the bitumen source material can be no greater than approximately 110° C., and the penetration distance of the bitumen source material is at least approximately 10 dmm. In yet one further embodiment, the bitumen source material can include a petroleum-based asphalt. The roofing-grade asphalt mixture has a softening point of at least approximately 104° C., a penetration distance no greater than approximately 12 dmm, a viscosity of at least approximately 3000 cps at a temperature of 177° C., or any combination thereof. The bio-source material can be an oil, the oil including cooking oil, vegetable oil, an animal oil, recycled cooking oil, or any combination thereof. The oil can also include recycled vegetable oil, recycled animal fat, any partially oxidized oil therefrom, or any combination thereof. Moreover, the oil can be partially oxidized.

In another embodiment, the softening point of the roofing-grade asphalt mixture can be at least approximately 100° C., at least approximately 103° C., or at least approximately 106° C. Yet in another embodiment, the softening point of the roofing grade asphalt mixture is no greater than approximately 120° C., no greater than approximately 115° C., or no greater than approximately 112° C. Moreover, the roofing-grade asphalt mixture can have a total bitumen content, wherein a bio-based oxidized material is at least approximately 5 wt %, at least approximately 11 wt %, or at least approximately 15 wt % of the total bitumen content. Further, the roofing-grade asphalt mixture has a bitumen content no greater than approximately 50 wt %, no greater than approximately 40 wt %, or no greater than approximately 35 wt %.

In yet one further embodiment, the roofing product can have a roofing-grade asphalt mixture, wherein at 177° C., the roofing-grade asphalt mixture has a viscosity of at least approximately 3500 cps, at least approximately 3700 cps, or at least approximately 3900 cps. Further, at 177° C., the roofing-grade asphalt mixture can have a viscosity no greater than approximately 4500 cps, no greater than approximately 4400 cps, or no greater than approximately 4300 cps.

In one embodiment, the particles of the roofing product can include limestone, talc, clay, coal fines, gypsum, calcite, dolomite, fly ash, or any combination thereof. In another embodiment, the base material of the roofing product can include a fiberglass mat, a cellulose-based material, or a polymer. The cellulose-based material can include wood or paper. If the base material is polymer based, the polymer can include a polyester. In one particular embodiment, the roofing-grade asphalt mixture substantially fills an open structure of the base material. In one further particular embodiment, at least 50% of the roofing-grade asphalt material can be outside of an open structure of the base material. In embodiments, the roofing product can include a roofing shingle, and a particle content is less than 80 weight % of the roofing-grade asphalt mixture. Yet in another embodiment, the particle content comprises approximately 64 weight % to approximately 70 weight % of the roofing-grade asphalt mixture. In yet further embodiments, the roofing product can include a membrane-type roofing product, and a particle content is less than 60 weight % of the roofing-grade asphalt mixture.

In one further embodiment, the roofing-grade asphalt mixture of the roofing product can further include a plasticizer. In other embodiments, the roofing product can further comprise roofing granules along a surface of the roofing product. In yet another embodiment, the roofing product can further include a release sheet along a surface of the roofing product. In one particular embodiment, the roofing product can be in a form of a roofing shingle or in a form of a roofing membrane.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A roofing grade asphalt mixture consisting of:
   a bio-asphalt, at least one bitumen source material, particles, and an optional plasticizer;
   wherein the bio-asphalt is an esterification or transesterification alkyd resin reaction product of a bio-source material in the presence of a polycarboxylic acid modifier;
      wherein the polycarboxylic acid consists of a phthalic acid, an isophthalic acid, a terephthalic acid, a tetrahydrophthalic acid, a naphthalene dicarboxylic acid, or any combination thereof;
   wherein the at least one bitumen source material is different than the bio-asphalt, the at least one bitumen source material consisting of a first bitumen source material, a second bitumen source material, or combination thereof selected from the group consisting of petroleum-based asphalt, coal tar, or combination thereof; and
      wherein the roofing grade asphalt mixture has a softening point of at least 104° C., a penetration distance of no greater than 12 dmm, and a viscosity of at least 3000 cps at a temperature of 177° C.

2. The roofing grade asphalt mixture of claim 1, wherein the bio-source material consists of an oil, the oil consisting of cooking oil, vegetable oil, an animal oil, recycled cooking oil, or any combination thereof.

3. The roofing grade asphalt mixture of claim 1, wherein the bio-asphalt is at least approximately 5 wt %, of a total bitumen content of the roofing grade asphalt mixture.

4. The roofing grade asphalt mixture of claim 1, wherein the optional plasticizer is present as a non-drying alkyd.

5. The roofing grade asphalt mixture of claim 1, wherein the second bitumen source material is different than the bio-asphalt and the first bitumen source material.

6. A roofing grade asphalt mixture consisting of:
   a bio-asphalt, a first bitumen source material, particles, and an optional plasticizer;
   wherein the bio-asphalt is an esterification or transesterification alkyd resin reaction product of a bio-source material in the presence of a polycarboxylic acid modifier;
      wherein the polycarboxylic acid consists of a phthalic acid, an isophthalic acid, a terephthalic acid, a tetrahydrophthalic acid, a naphthalene dicarboxylic acid, or any combination thereof;
   wherein the first bitumen source material is different than the bio-asphalt, the first bitumen source material selected from the group consisting of petroleum-based asphalt, coal tar, or combination thereof;
   wherein the roofing grade asphalt mixture has a penetration distance of no greater than 17 dmm.

7. The roofing grade asphalt mixture of claim 6, wherein the bio-source material consists of recycled vegetable oil.

8. The roofing grade asphalt mixture of claim 6, wherein the bio-asphalt is at least approximately 11 wt % and not greater than 50 wt % of a total bitumen content of the roofing grade asphalt mixture.

9. The roofing grade asphalt mixture of claim 6, wherein the optional plasticizer is present as a non-drying alkyd.

10. The roofing grade asphalt mixture of claim 6, wherein the particle content consists of 64 wt % to 70 wt % of the roofing-grade asphalt mixture.

11. The roofing grade asphalt mixture of claim 6, wherein the particles are limestone, talc, clay, coal fines, gypsum, calcite, dolomite, or fly ash.

* * * * *